United States Patent
Nokkonen

(10) Patent No.: US 9,491,345 B2
(45) Date of Patent: Nov. 8, 2016

(54) ADJUSTMENT OF FLASH DEVICE BASED ON TEMPERATURE

(71) Applicant: INTEL CORPORATION, Santa Clara, CA (US)

(72) Inventor: Erkki Nokkonen, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,554

(22) Filed: Mar. 28, 2014

(65) Prior Publication Data

US 2015/0281537 A1 Oct. 1, 2015

(51) Int. Cl.
| | |
|---|---|
| H04N 5/225 | (2006.01) |
| G01K 7/00 | (2006.01) |
| G03B 15/05 | (2006.01) |
| H04N 5/232 | (2006.01) |
| H05B 33/08 | (2006.01) |

(52) U.S. Cl.
CPC ............. *H04N 5/2256* (2013.01); *G01K 7/00* (2013.01); *G03B 15/05* (2013.01); *H04N 5/23241* (2013.01); *H05B 33/0848* (2013.01); *H05B 33/0854* (2013.01)

(58) Field of Classification Search
CPC .. H04N 5/2256; H04N 5/23241; G01K 7/00; G03B 15/05; H05B 33/0848
See application file for complete search history.

(56) References Cited

U.S. PATENT DOCUMENTS

| | | |
|---|---|---|
| 2001/0002865 A1 | 6/2001 | Lipponen et al. |
| 2001/0022513 A1 | 9/2001 | Nokkonen |
| 2001/0023176 A1 | 9/2001 | Talvitie et al. |
| 2001/0041541 A1 | 11/2001 | Nokkonen et al. |
| 2005/0210301 A1 | 9/2005 | Nokkonen |
| 2006/0085654 A1 | 4/2006 | Nokkonen |
| 2006/0117192 A1 | 6/2006 | Nokkonen |
| 2007/0247216 A1 | 10/2007 | Kolinummi et al. |
| 2010/0090644 A1 | 4/2010 | Nokkonen et al. |
| 2010/0213842 A1* | 8/2010 | Geris ..................... G03B 15/05 315/33 |
| 2012/0140088 A1* | 6/2012 | Clark ......................... 348/211.2 |
| 2012/0293092 A1* | 11/2012 | Yim ................. H05B 33/0854 315/308 |
| 2014/0015447 A1 | 1/2014 | Shi et al. |
| 2014/0139702 A1 | 5/2014 | Kawakami |

FOREIGN PATENT DOCUMENTS

| | | |
|---|---|---|
| CN | 101025544 A | 8/2007 |
| TW | M460478 U | 8/2013 |
| TW | 201404241 A | 1/2014 |

OTHER PUBLICATIONS

Taiwanese Search Report for Application 104104261 dated Dec. 3, 2015.

* cited by examiner

*Primary Examiner* — Mekonnen Dagnew
(74) *Attorney, Agent, or Firm* — KED & Associates LLP

(57) ABSTRACT

A method may be provided that includes sensing a temperature, determining a current of a flash device based on the sensed temperature, and operating the flash device based on the determined current to provide light.

9 Claims, 6 Drawing Sheets

| SENSED TEMPERATURE | DETERMINED POWER LEVEL | CURRENT |
|---|---|---|
| > 59° F | PL1 | 1.8A |
| ≥ 41° F - 59° F | PL2 | 0.9A |
| < 41° F | PL3 | 0.45A OR DISABLED |

*FIG. 5*

ADJUSTMENT OF FLASH DEVICE BASED ON TEMPERATURE

BACKGROUND

1. Field

Embodiments may relate to an electronic device to control a camera flash based on temperature.

2. Background

A camera may operate with a flash device in order to produce a flash of light. The flash may illuminate an object or a scene.

BRIEF DESCRIPTION OF THE DRAWINGS

Arrangements and embodiments may be described in detail with reference to the following drawings in which like reference numerals refer to like elements and wherein:

FIG. 5 is a table showing difference combinations of on sensed temperatures, power levels and operating currents according to an example embodiment.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Figure 1:
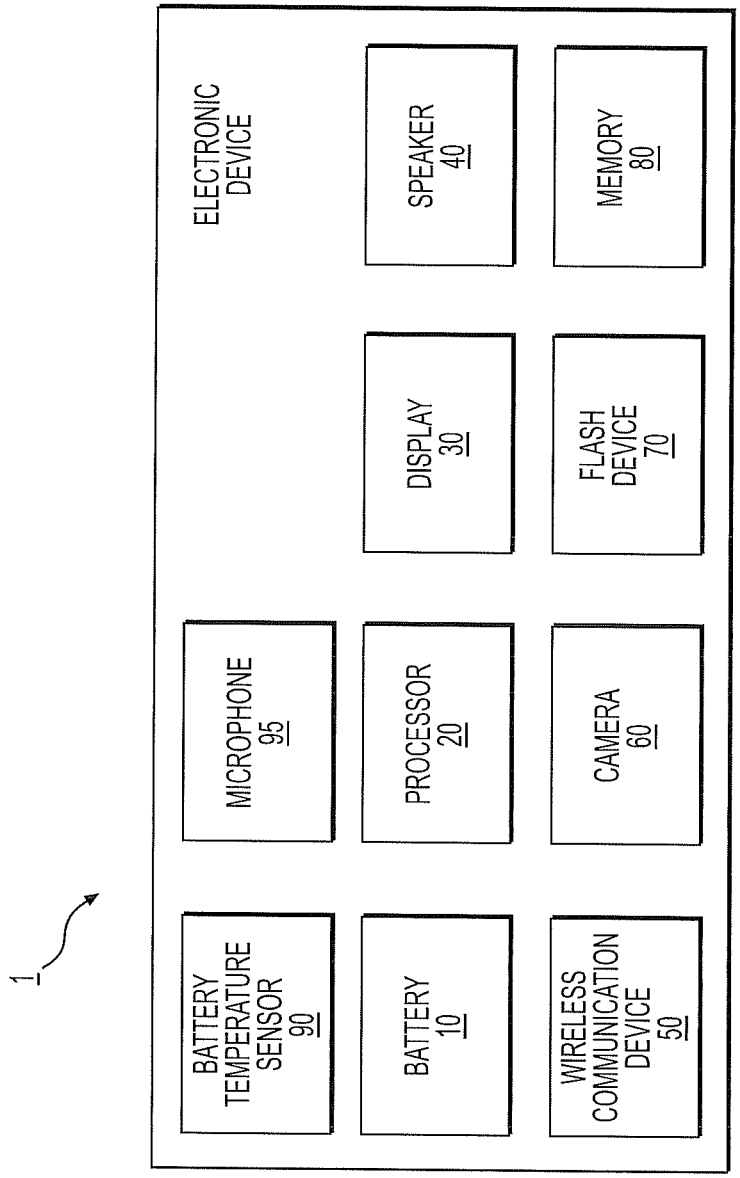
FIG. 1 shows an electronic device according to an example arrangement.

FIG. 1 shows an electronic device according to an example arrangement. Other arrangements may also be provided.

More specifically, FIG. 1 shows an electronic device 1 that includes various electronic components. FIG. 1 shows the electronic device 1 includes a battery 10, a processor 20, a display 30, a speaker 40, a wireless communication device 50, a camera 60 (or camera module), a flash device 70, a memory 80 (or storage device), a battery temperature sensor 90 and a microphone 95. Other components and/or fewer components may also be provided.

In at least one arrangement, the processor 20 (and/or the software running or operating on the processor 20) may perform operations relating to image capturing and processing as well as storing and displaying of image data. The display 30 may display an image.

In at least one arrangement, another processor may perform image capturing and processing. The other processor may also control a brightness of the flash (or light) from the flash device.

In at least one arrangement, the camera 60 (or camera module) may include the processor and/or software (or algorithm) in order to perform the image capturing and processing.

The electronic device 1 may be any one of a mobile terminal, a mobile device, a mobile computing platform, a mobile platform, a laptop computer, a tablet, an ultra-mobile personal computer (PC), a mobile Internet device, a smart-phone, a personal digital assistant, a display device, a television (TV), etc. For ease of description, the following discussion may relate to a mobile terminal. The electronic device may be considered an apparatus.

In at least one arrangement, the flash device 70 may include a light source and a driver. The light source may be a light emitting diode (LED), for example. The LED may be controlled by the driver. The LED may also be controlled by a controller, such as an LED controller.

The driver may adjust a brightness of the LED based on a power level (or current) applied to the LED. For example, when a higher power level (or higher current) is applied to the LED, then the LED may provide a greater brightness of light. On the other hand, when a lower power level (or current) is applied to the LED, then the LED may provide a lower brightness of light.

In at least one arrangement, the driver may be a driver integrated circuit (IC).

Figure 2:
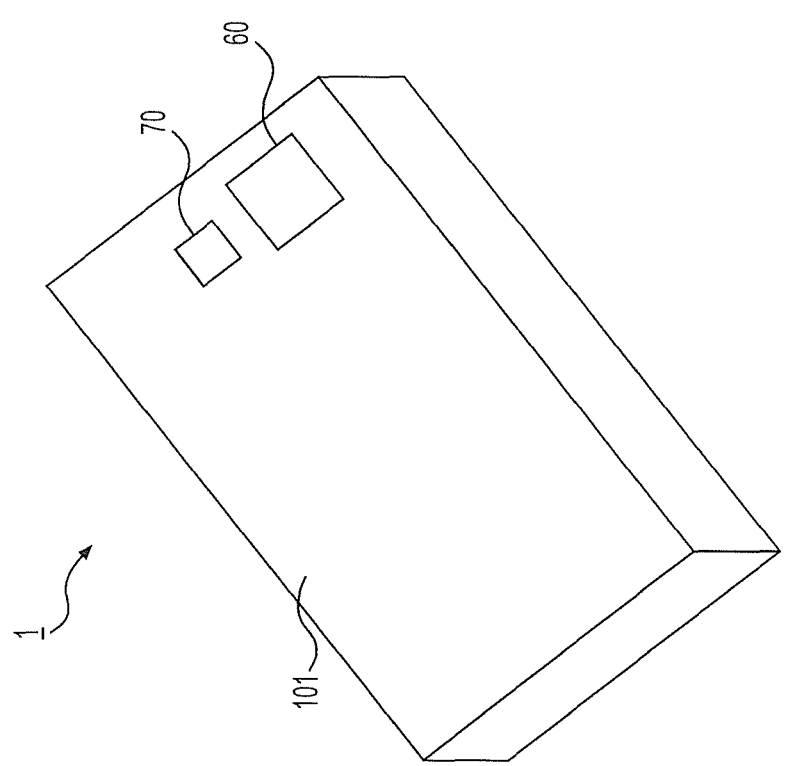
FIG. 2 shows a back side of an electronic device according to an example arrangement.

FIG. 2 shows a back side of a mobile terminal according to an example arrangement. Other arrangements may also be provided.

More specifically, FIG. 2 shows a back surface 101 (or rear surface) of the electronic device 1. The camera 60 may be on the back surface 101 of the electronic device 1. The camera 60 may be referred to as a rear camera. The flash device 70 may be provided on the back surface 101 of the electronic device 1. The flash device 70 may be adjacent to the camera 60 (or camera module).

The flash device 70 may provide light (or a flash) in a direction toward a particular object (such as a person) or scene.

The flash device 70 may output light (or provide a flash) a plurality of times in response to camera input (or camera activation). The camera input may be a user input. The flash may be a turning on of a light source and a turning off of the light source. The flash (or light output) may occur a plurality of times prior to the camera 60 capturing an image.

The flash device 70 may include a light emitting diode (LED) as the light source. The LED may be called a flash LED. The LED may be controlled by an LED driver (or LED controller) to turn the LED on and off a plurality of times. The LED controller or LED driver may also control a brightness of the LED.

The flash device 70 that includes the LED may be powered by the battery 10, for example. Performance of the LED may be based on power (or current) from the battery 10.

For example, a brightness of light from the LED may be dependent on battery impedance and/or battery voltage droop. For example, the battery impedance and/or the battery voltage droop may increase rapidly when a battery temperature decreases. As another example, the battery impedance and/or the battery voltage droop may increase rapidly when an ambient temperature of the electronic device decreases.

The LED may operate at any of a plurality of power levels. Each power level corresponds to an operating current of the LED.

The plurality of power levels (or currents) of the LED may be determined and/or stored in the electronic device (or the flash device). Information of the power level (or current) of the LED may be stored in a memory, an LED controller and/or an LED driver of the electronic device.

The power level of the LED may represent an operational current of the LED in order to provide light.

The selection of the proper power level may be relevant to other components. For example, if the LED power level is set too high while the electronic device is in a cold environment, then other components of the electronic device 1 may be shut down (or need to be shut down) because the battery voltage may decrease to a level below a minimum allowed level.

Figure 3:
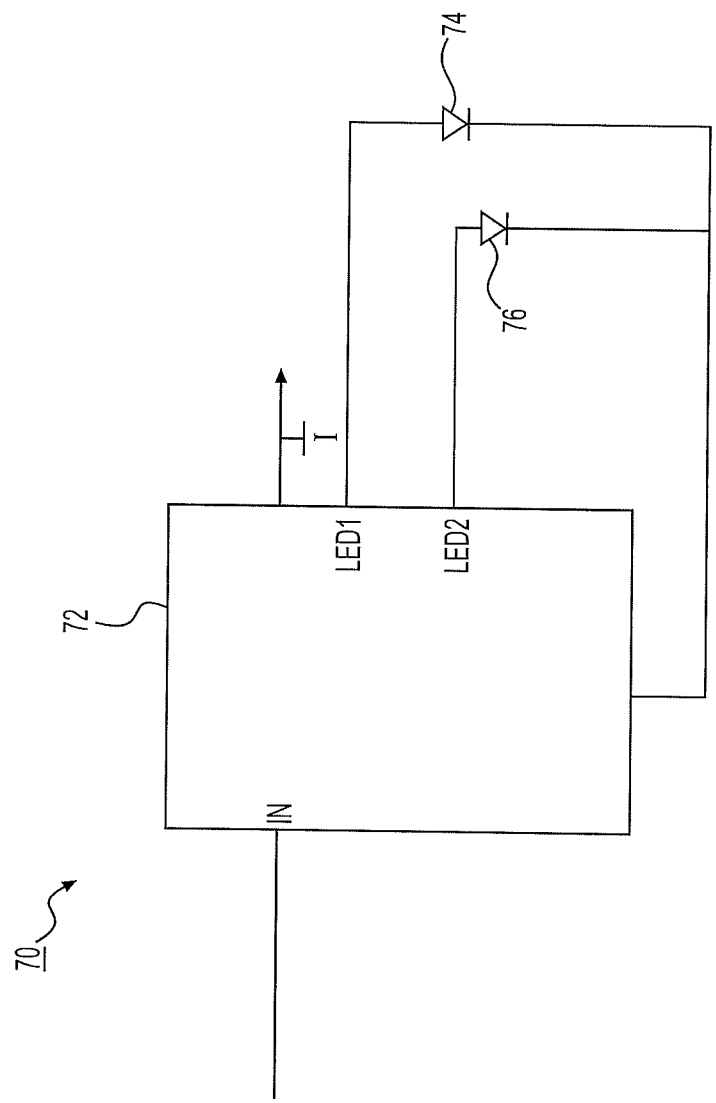
FIG. 3 is a diagram of a flash driver according to an example arrangement.

FIG. 3 is a diagram of a flash driver according to an example arrangement. Other arrangements and configurations may also be provided.

FIG. 3 shows one example of the flash device 70 that may include a driver 72, a first LED 74 and a second LED 74. The driver 72 may be considered a flash driver integrated circuit (IC). The driver 72 may receive an input voltage at an input IN. The input voltage may be a battery voltage.

In one arrangement, the driver 72 may include a boost converter with constant current drivers for high-current white LEDs. The dual high-side current sources may allow for grounded cathode LED operation.

The LED brightness (and power) may be adjusted by selecting (or providing) a current flowing through the LED. The LED power may be equal to a voltage over the LED times a current through the LED.

A small change in the voltage over (or across) the LED may impact the current dramatically. However, a brightness of the LED may be linearly proportional to the current.

Additionally, the power taken from the battery may be proportional to the LED power. The battery power may be "battery voltage" times "battery current."

The battery current may cause the battery voltage to droop (i.e., an IR droop) due to impedance of the battery.

Embodiments may adjust (or change) a power level of the LED based on a sensed temperature, such as a sensed battery temperature. This may allow a brighter LED flash and therefore a better quality image (taken by the camera). The flash device may operate based on the determined current to provide light.

Figure 4:
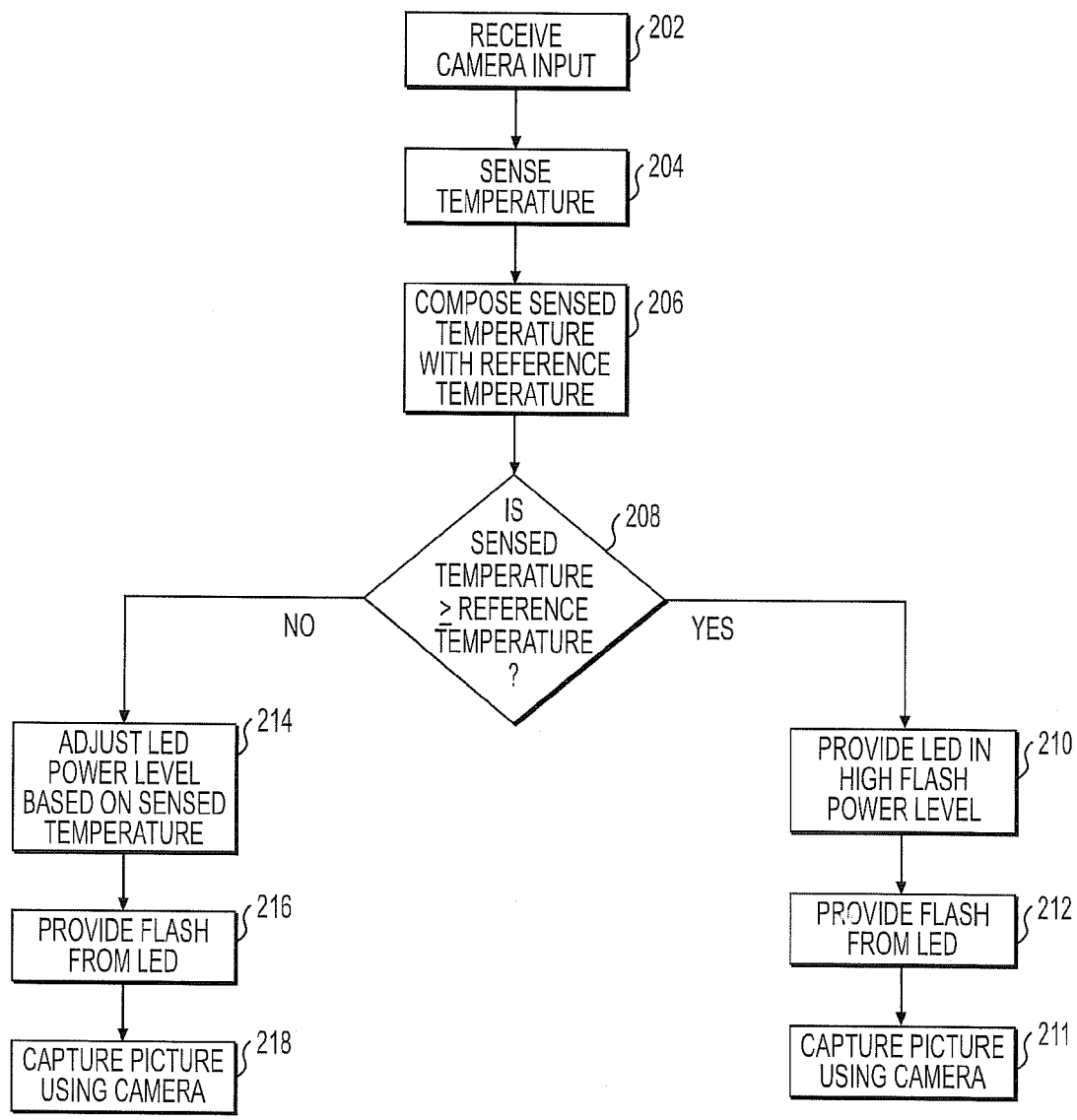
FIG. 4 is a flowchart of operations of controlling a camera flash according to an example embodiment.

FIG. 4 is a flowchart of operations of controlling a camera flash according to an example embodiment. Other operations, orders of operations and embodiments may also be provided.

More specifically, FIG. 4 shows that a camera input (or camera activation input) may be received in operation 202. This may be an input by a user to take a picture using the camera 60. The camera input may be based on an input to a touchscreen (such as the display 30) and/or based on an input to a button or key of the electronic device 1.

In operation 204, a temperature may be sensed (or determined) by a sensor. In at least one embodiment, a battery temperature may be sensed by a battery temperature sensor. For example, a battery charger integrated circuit (IC) may include a temperature sensor. In at least one embodiment, an ambient temperature at the electronic device 1 may be sensed by a temperature sensor of the electronic device (or electronic system). The sensing of the temperature (or ambient temperature) in operation 204 may also occur prior to the camera input (in operation 202).

In operation 206, the sensed temperature may be compared to a reference temperature. The reference temperature may be a present (or prestored) temperature. This comparison may determine whether the sensed temperature is too cold, for example. The comparison may be performed by the processor (and/or software within the processor). The comparison may also be performed by logic, at least a portion of which is hardware.

In operation 208, a determination may be made (based on the comparison) whether the sensed temperature is greater than or equal to the reference temperature. If the determination is YES in operation 208, then a power level of the LED may be determined based on the sensed temperature in operation 210. The power level may be determined based on the stored information relating to a plurality of power levels. For example, if the sensed temperature is greater than or equal to the reference temperature, then the LED power level may be determined to be a HIGH FLASH power level.

The LED may provide a plurality of flashes by operating based on (or at) the determined power level (or current) in operation 212.

In operation 211, the camera 60 may capture a picture. The camera 60 may capture the picture while the light or flash is being provided.

If the determination is NO in operation 208, then a LED power level may be adjusted (or changed) in operation 214 based on the sensed temperature. That is, the LED power level may be determined based on the sensed temperature. The adjusted power level may be any one of a plurality of power levels that are stored on the device. The power levels may be preset to correspond to specific temperature values. For example, a memory may store information regarding LED power levels, sensed temperatures and/or current value (s) for the LED(s).

The LED may provide a plurality of flashes by operating based on (or at) the determined power level (or current) in operation 216. The determined power level corresponds to providing a prescribed current across the LED.

In operation 218, the camera 60 may capture a picture. The camera 60 may capture the picture while the light or flash is being provided.

Embodiments may adjust LED flash power levels (or current) as a function of a battery temperature, for example. In at least one embodiment, a flash may be totally disabled in an extremely cold sensed temperature.

Embodiments may dynamically change a power level (or current) as a function of battery temperature.

In at least one embodiment, when the sensed temperature is normal (or high), then a high power level (or current) of the LED flash may be used. In at least one embodiment, when the sensed temperature is low, then a reduced power level of the LED flash may be used. When the sensed temperature is extremely low, then the LED may be totally disabled, for example.

In at least one embodiment, when the camera and the LED are activated by the user (such as a camera activation), then a driver (or controller) may configure the flash power based on the sensed temperature.

FIG. 5 is a table showing different combinations of sensed temperatures, power levels and operating currents according to an example embodiment. Other values and embodiments may also be provided.

FIG. 5 shows that when the sensed temperature is greater than 59° Fahrenheit (or 15° Celsius), then a maximum power level (PL1) may be used. For example, FIG. 5 shows that a current of 1.8 Amps (A) may be provided through an LED (or across the LED).

FIG. 5 shows that when the sensed temperature is between 41° Fahrenheit and 59° Fahrenheit (or between +5° and +15° Celsius), then another power level PL2 may be used. For example, FIG. 5 shows that a current of 0.9 A may be provided through an LED (or across the LED).

FIG. 5 shows that when the sensed temperature is below 41° Fahrenheit (or +5° Celsius), then the current through the LED may be 0.45 A or the LED may be disabled.

The adjustment of a power of the flash device may be relevant because lithium-ion (Li-ion) battery impedance may have a steep dependency based on a decreasing temperature. For example, battery impedance may start to increase at below 68° Fahrenheit (or 20° Celsius). At a sensed temperature of 50° Fahrenheit (or +10° Celsius), the battery impedance may be already 1.5 times greater as compared to battery impedance at 77° Fahrenheit (or 25° Celsius). At a sensed temperature of 41° Fahrenheit (or +5° Celsius), the battery impedance may be 3 times greater than battery impedance at 77° Fahrenheit (or 25° Celsius). The voltage droop may behave similarly (i.e., at 50° Fahrenheit (or 10° Celsius) the voltage droop may be approximately 1.5 times greater than the voltage droop at 77° Fahrenheit (or 25° Celsius)).

The battery voltage droop may be even higher, because the LED flash driver may consume a fixed power from the battery regardless of battery voltage level. This may mean that when the battery voltage drops, then the battery current must increase to maintain a constant power level. This may further increase the voltage droop, which may further increase the current until a steady state is found. Thus, at a sensed temperature of 50° Fahrenheit (or +10° Celsius), the voltage droop may be 2 times greater than the voltage droop at 77° Fahrenheit (or 25° Celsius).

Figure 6:
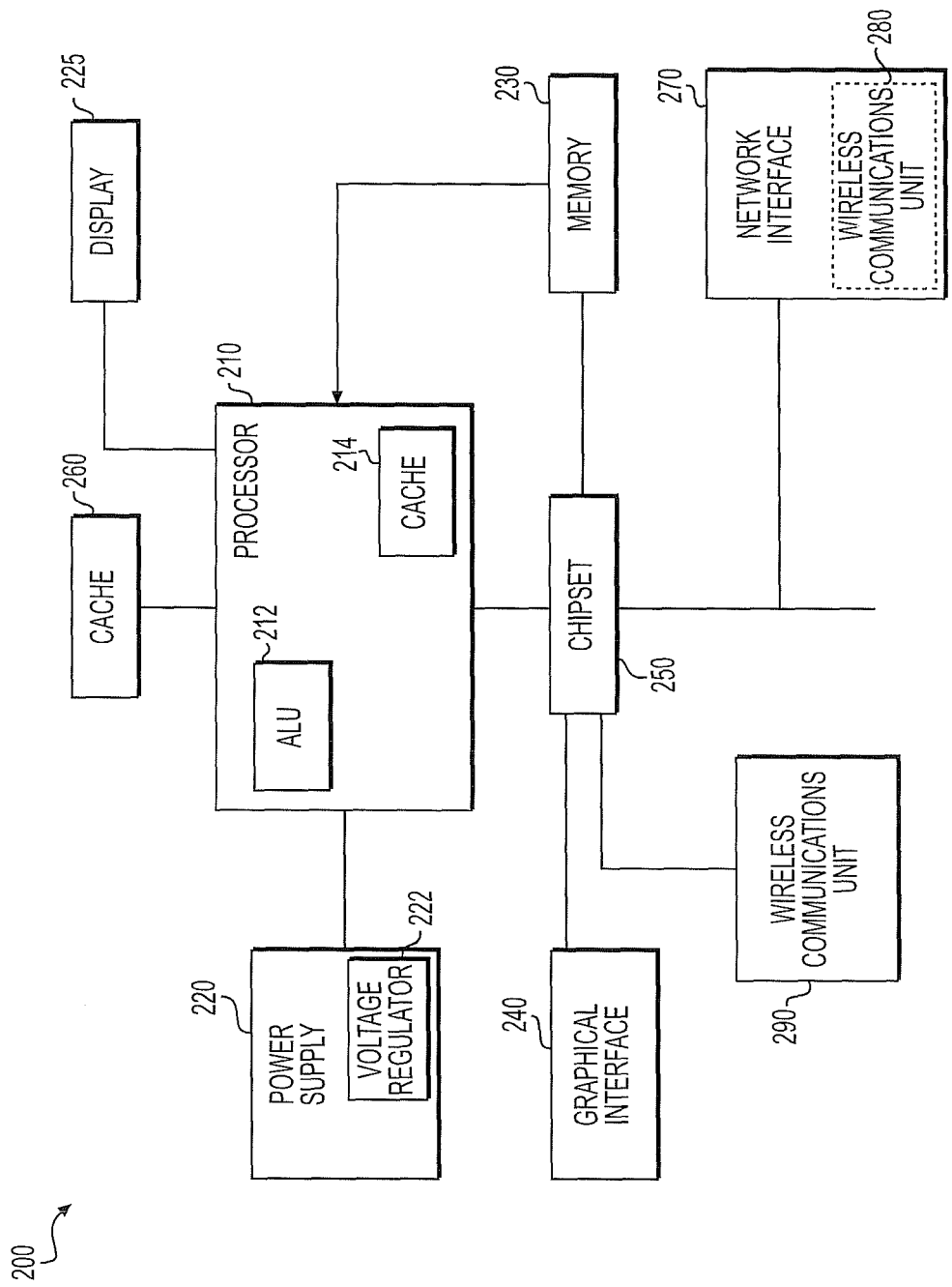
FIG. 6 shows an electronic system according to an example embodiment.

FIG. 6 shows an electronic system according to an example embodiment. Other embodiments and configurations may also be provided.

More specifically, FIG. 6 shows a system 200 that includes a processor 210, a power supply 220, a display 225 and a memory 230, which may be a random access memory, for example. The processor 210 may include an arithmetic logic unit 212 and an internal cache 214, for example. The processor 210 may perform operations discussed above by using the instructions received, such as via a computer-readable medium (or machine-readable medium). Operations may also be performed by logic, at least a portion of which is hardware.

A voltage regulator 222 may be provided as a part of the power supply.

The system 200 may also include a graphical interface 240, a chipset 250, a cache 260, a network interface 270 and a wireless communication unit 280, which may be incorporated within the network interface 270. Alternatively or additionally, a wireless communications unit 290 may be coupled to the processor 210, and a direct connection may exist between the memory 230 and the processor 210.

The above-described arrangements and/or embodiments may be provided as part of the electronic system. For example, the electronic system may include the camera, the flash device and the sensor. Additionally, the electronic system 200 may also include logic, at least a portion of which is hardware, to determine a current of the flash device based on the sensed temperature. The flash device may operate based on the determined current to provide light.

The processor 210 may be a central processing unit, a microprocessor or any other type of processing or computing circuit and may be included on a chip die with all or any combination of the remaining features, or one or more of the remaining features may be electrically coupled to the microprocessor die through known connections and interfaces. Also, the connections that are shown are merely illustrative as other connections between or among the elements depicted may exist depending, for example, on chip platform, functionality, or application requirements.

In at least one embodiment, a computer-readable medium (or machine-readable medium) may store a program for controlling circuitry, logic (at least a portion of which is hardware) and/or the processor to adjust a power level of a flash device (or current through an LED), such as a flash LED. The circuitry, logic and/or processor may control the flash LED. The program may be stored in a memory, which for example, may be internal or external to the electronic device and/or electronic system. In at least one embodiment, the program may be part of a control algorithm for controlling operations of the flash LED.

Instructions or code executed by circuitry, logic and/or a processor (or a flash driver) may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-readable medium (or computer-readable medium) may include random access memory (RAM), read only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry and/or logic (at least a portion of which is hardware) may be used in place of or in combination with the instructions or code, and thus embodiments are not limited to any specific combination of hardware circuitry, logic and/or software instructions.

The program may include code or instructions to perform any of the operations or functions performed in embodiments previously discussed above.

The following examples pertain to further embodiments.

In Example 1, a method of an electronic device comprising: sensing a temperature, determining a current of a flash device based on the sensed temperature, and operating the flash device based on the determined current to provide light.

In Example 2, the subject matter of Example 1 can optionally include capturing an image while providing light from the flash device.

In Example 3, the subject matter of Example 1 can optionally include that sensing the temperature includes sensing a temperature of a battery.

In Example 4, the subject matter of any one of Examples 1-2 can optionally include that sensing the temperature includes sensing an ambient temperature of the electronic device.

In Example 5, the subject matter of any one of Examples 1-2 can optionally include that determining the current includes determining a power level of the flash device.

In Example 6, the subject matter of Example 1 and Example 5 can optionally include that operating the flash device based on the determined current includes operating the flash device at the determined power level.

In Example 7, the subject matter of any one of Examples 1-2 can optionally include that determining the current includes determining a decreased current of the flash device when the sensed temperature is below a prescribed temperature.

Example 8 is an electronic apparatus comprising: a camera to capture an image, a flash device to provide light, a sensor to sense a temperature, and a processor to determine a current of the flash device based on the sensed temperature, and the flash device to operate based on the determined current to provide light.

In Example 9, the subject matter of Example 8 can optionally include that the flash device includes a light emitting diode.

In Example 10, the subject matter of Example 8 and Example 9 can optionally include that the flash device further includes a flash driver to control the light emitting diode.

In Example 11, the subject matter of Example 8 can optionally include that the camera to capture the image while the flash device provides the light.

In Example 12, the subject matter of any one of Examples 8-11 can optionally include that the sensor is a battery temperature sensor to sense a temperature of a battery.

In Example 13, the subject matter of any one of Examples 8-11 can optionally include that the sensor is an ambient temperature sensor to sense an ambient temperature of the apparatus.

In Example 14, the subject matter of Example 8 can optionally include that the processor to adjust a power level of the flash device.

In Example 15, the subject matter of Example 8 and Example 14 can optionally include that the flash device to operate at the adjusted power level to provide light.

In Example 16, the subject matter of any one of Examples 8-11 can optionally include that the processor to decrease the current of the flash device when the sensed temperature is below a prescribed temperature.

Example 17 is an electronic device comprising: first means for capturing an image, second means for providing light, third means for sensing a temperature, and fourth means for determining a current of the flash device based on the sensed temperature, and the second means to operate based on the determined current.

In Example 18, the subject matter of Example 17 can optionally include that the second means for providing light includes a light emitting diode.

In Example 19, the subject matter of Example 17 and Example 18 can optionally include that the second means for providing light includes a flash driver to control the light emitting diode.

In Example 20, the subject matter of Example 17 can optionally include that the first means for capturing an image to capture the image while the second means provides the light.

In Example 21, the subject matter of any one of Examples 17-20 can optionally include that the third means includes a battery temperature sensor to sense a temperature of a battery.

In Example 22, the subject matter of any one of Examples 17-20 can optionally include that the third means for sensing includes an ambient temperature sensor to sense an ambient temperature of the electronic device.

In Example 23, the subject matter of any one of Examples 17-20 can optionally include that the fourth means for determining to adjust a power level of the second means for providing light.

In Example 24, the subject matter of Example 17 and Example 23 can optionally include that the second means for providing light to operate at the adjusted power level to provide light.

In Example 25, the subject matter of any one of Examples 17-20 can optionally include that the fourth means for determining the current decreases the current of the second means when the sensed temperature is below a prescribed temperature.

Example 26 is an electronic system comprising: a display to display an image, a camera to capture an image, a flash device to provide light, a sensor to sense a temperature, and logic, at least a portion of which is hardware, to determine a current of the flash device based on the sensed temperature, and the flash device to operate based on the determined current.

In Example 27, the subject matter of Example 26 can optionally include a memory.

In Example 28, the subject matter of Example 26 can optionally include that the flash device includes a light emitting diode.

In Example 29, the subject matter of Example 26 and Example 28 can optionally include the flash device further includes a flash driver to control the light emitting diode.

In Example 30, the subject matter of any one of Examples 26-29 can optionally include that the camera to capture the image while the flash device provides the light.

In Example 31, the subject matter of any one of Examples 26-29 can optionally include that the sensor is a battery temperature sensor to sense a temperature of a battery.

In Example 32, the subject matter of any one of Examples 26-29 can optionally include that the sensor is an ambient temperature sensor to sense an ambient temperature of the system.

In Example 33, the subject matter of any one of Examples 26-29 can optionally include that the logic to adjust a power level of the flash device.

In Example 34, the subject matter of Example 26 and Example 33 can optionally include that the flash device to operate at the adjusted power level to provide light.

In Example 35, the subject matter of any one of Examples 26-29 can optionally include that the logic to decrease the current of the flash device when the sensed temperature is below a prescribed temperature.

Example 36 is an electronic apparatus comprising: logic, at least a portion of which is hardware, to determine a current of a flash device based on a sensed temperature and to operate the flash device based on the determined current.

In Example 37, the subject matter of Example 36 can optionally include a camera to capture an image while light is provided from the flash device.

In Example 38, the subject matter of Example 36 can optionally include a sensor to sense a temperature of a battery.

In Example 39, the subject matter of Example 36 can optionally include a sensor to sense an ambient temperature of the apparatus.

In Example 40, the subject matter of any one of Examples 36-39 can optionally include that the logic to determine the current by determining a power level of the flash device.

In Example 41, the subject matter of Example 36 and Example 40 can optionally include the logic to operate the flash device at the determined current by operating the flash device at the adjusted power level.

In Example 42, the subject matter of Example 36 can optionally include the logic to determine the current by determining a decreased current of the flash device when the sensed temperature is below a prescribed temperature.

Example 43 is a machine-readable medium comprising one or more instructions that when executed cause a processor to perform one or more operations to: determine a current of a flash device based on a sensed temperature, and operate the flash device based on the determined current.

In Example 44, the subject matter of Example 43 can optionally include that the sensed temperature is a sensed temperature of a battery.

In Example 45, the subject matter of Example 43 can optionally include that the sensed temperature is a sensed ambient temperature.

In Example 46, the subject matter of Example 43 can optionally include that the current is determined by determining a power level of the flash device.

In Example 47, the subject matter of Example 43 and Example 46 can optionally include that the one or more operations to include to operate the flash device at the determined current by operating the flash device at the determined power level.

In Example 48, the subject matter of any one of Examples 43-47 can optionally include that the one or more operations to include to determine the current by determining a decreased current of the flash device when the sensed temperature is below a prescribed temperature.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of an electronic device comprising:
   sensing an ambient temperature of the electronic device;
   determining whether the sensed ambient temperature is greater than a previously stored reference temperature;
   when the sensed ambient temperature is determined to be greater than the previously stored reference temperature, determining a previously stored high power level for a flash device;
   when the sensed ambient temperature is determined to be less than the reference temperature, selecting one of a plurality of pre-stored power levels in which each power level is associated with a different temperature value;
   operating the flash device at the determined power level to provide light;
   sensing a temperature of a battery of the electronic device; and
   shutting down a component of the electronic device when the sensed temperature of the battery is below a minimum value.

2. The method of claim 1, further comprising:
   capturing an image while providing light from the flash device.

3. An electronic apparatus comprising:
   a memory to store a plurality of pre-stored power levels each corresponding specifically to a different corresponding temperature;
   a camera to capture an image;
   a flash device to provide light;
   an ambient temperature sensor to sense an ambient temperature of the electronic apparatus;
   a battery temperature sensor to sense a temperature of a battery; and
   a processor to determine whether the sensed ambient temperature is greater than a previously stored reference temperature, and when the sensed ambient temperature is determined to be greater than the previously stored reference temperature, the processor to determine a previously stored high power level for a flash device, and when the sensed ambient temperature is determined to be less than the reference temperature, the processor to select one of the plurality of stored power levels of the flash device based on the sensed ambient temperature, and the flash device to operate based on the determined power level to provide light, and the processor to shut down a component of the electronic device when the sensed temperature of the battery is below a minimum value.

4. The apparatus of claim 3, wherein the flash device includes a light emitting diode.

5. The apparatus of claim 4, wherein the flash device further includes a flash driver to control the light emitting diode.

6. The apparatus of claim 3, wherein the camera to capture the image while the flash device provides the light.

7. The apparatus of claim 3, wherein the processor to decrease the current of the flash device when the sensed ambient temperature is below a prescribed temperature.

8. An electronic apparatus comprising:
   logic, at least a portion of which is hardware, to determine whether a sensed ambient temperature is greater than a previously stored reference temperature, and when the sensed ambient temperature is determined to be greater than the previously stored reference temperature, the logic to determine a previously stored high power level for a flash device, and when the sensed ambient temperature is determined to be less than the reference temperature, the logic to select one of stored plurality of power levels of the flash device based on the sensed ambient temperature and to operate the flash device based on the determined power level, and the power levels are stored to each correspond to a different one of the plurality of temperatures, wherein the logic to sense a temperature of a battery of the electronic device, and to shut down a component of the electronic device when the sensed temperature of the battery is below a minimum value.

9. The apparatus of claim 8, further comprising:
   a camera to capture an image while light is provided from the flash device.

* * * * *